July 22, 1947. L. D. HANSEN ET AL 2,424,275
ELECTRICAL TESTING APPARATUS
Filed Feb. 8, 1944 5 Sheets-Sheet 1
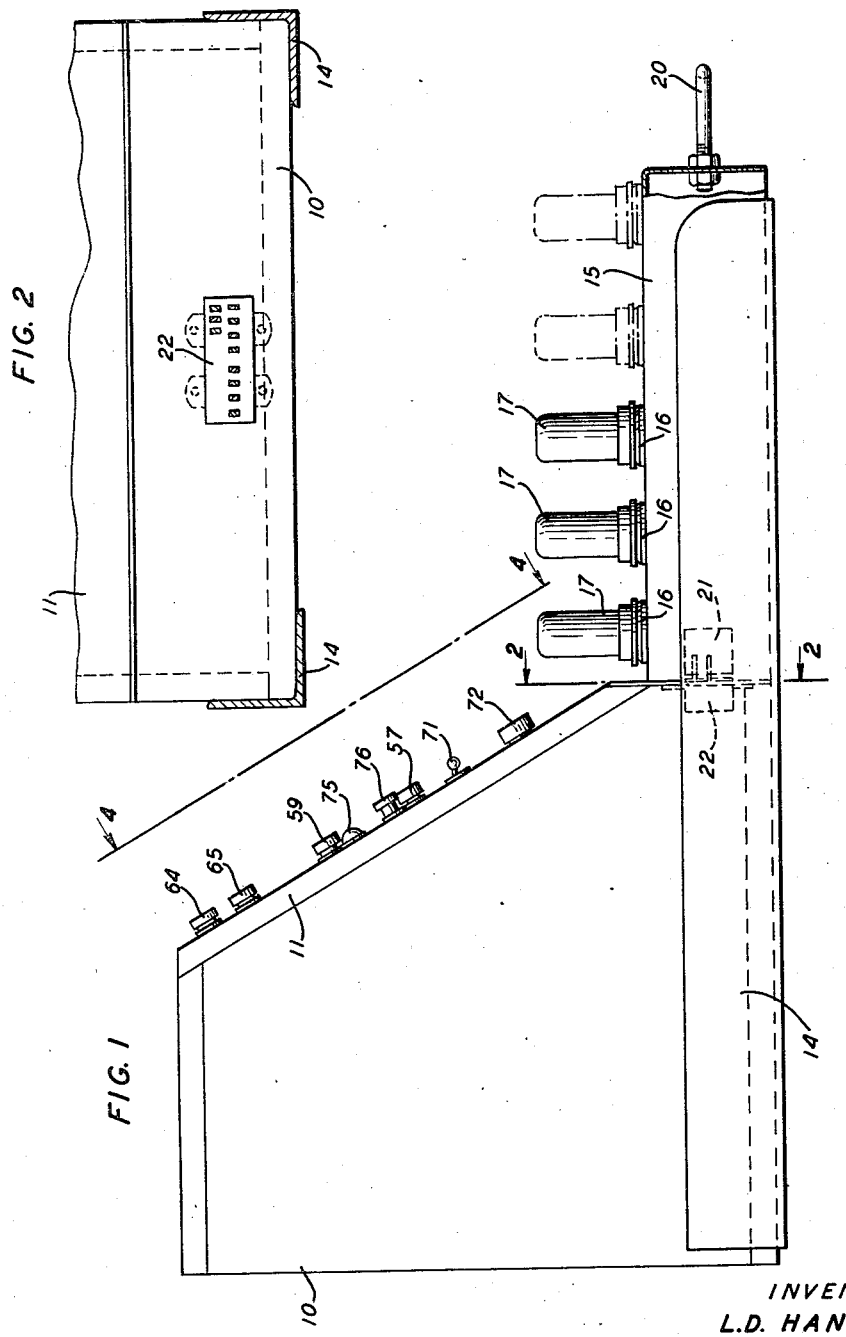
INVENTORS
L.D. HANSEN
A.S. HEGEMAN JR.
H.N. SNOOK
BY E.R. Nowlan
ATTORNEY

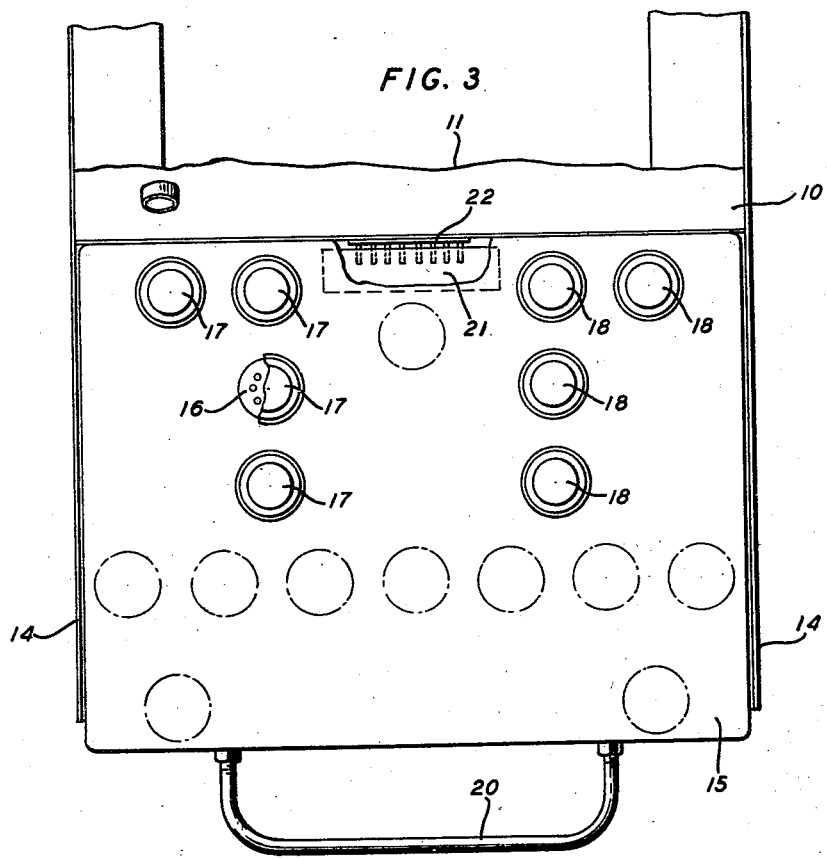
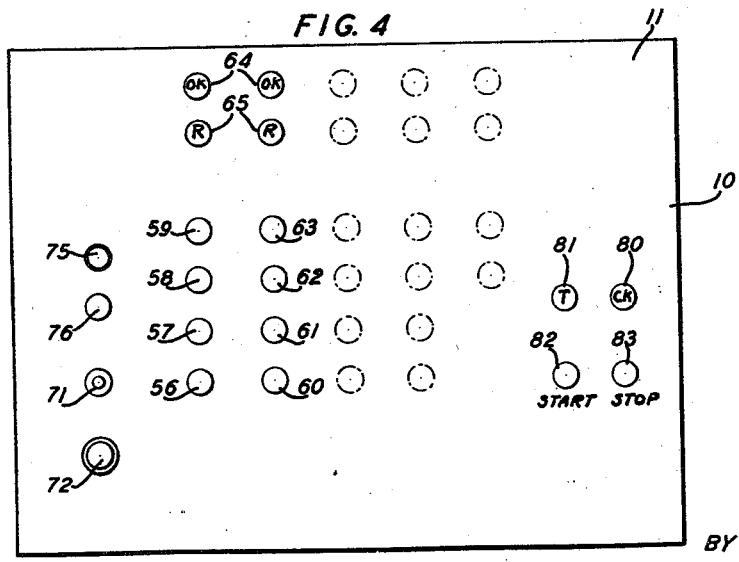

July 22, 1947.    L. D. HANSEN ET AL    2,424,275
ELECTRICAL TESTING APPARATUS
Filed Feb. 8, 1944    5 Sheets-Sheet 3

INVENTORS
L.D. HANSEN
A.S. HEGEMAN Jr.
H.N. SNOOK

BY E.R. Nowlan
ATTORNEY

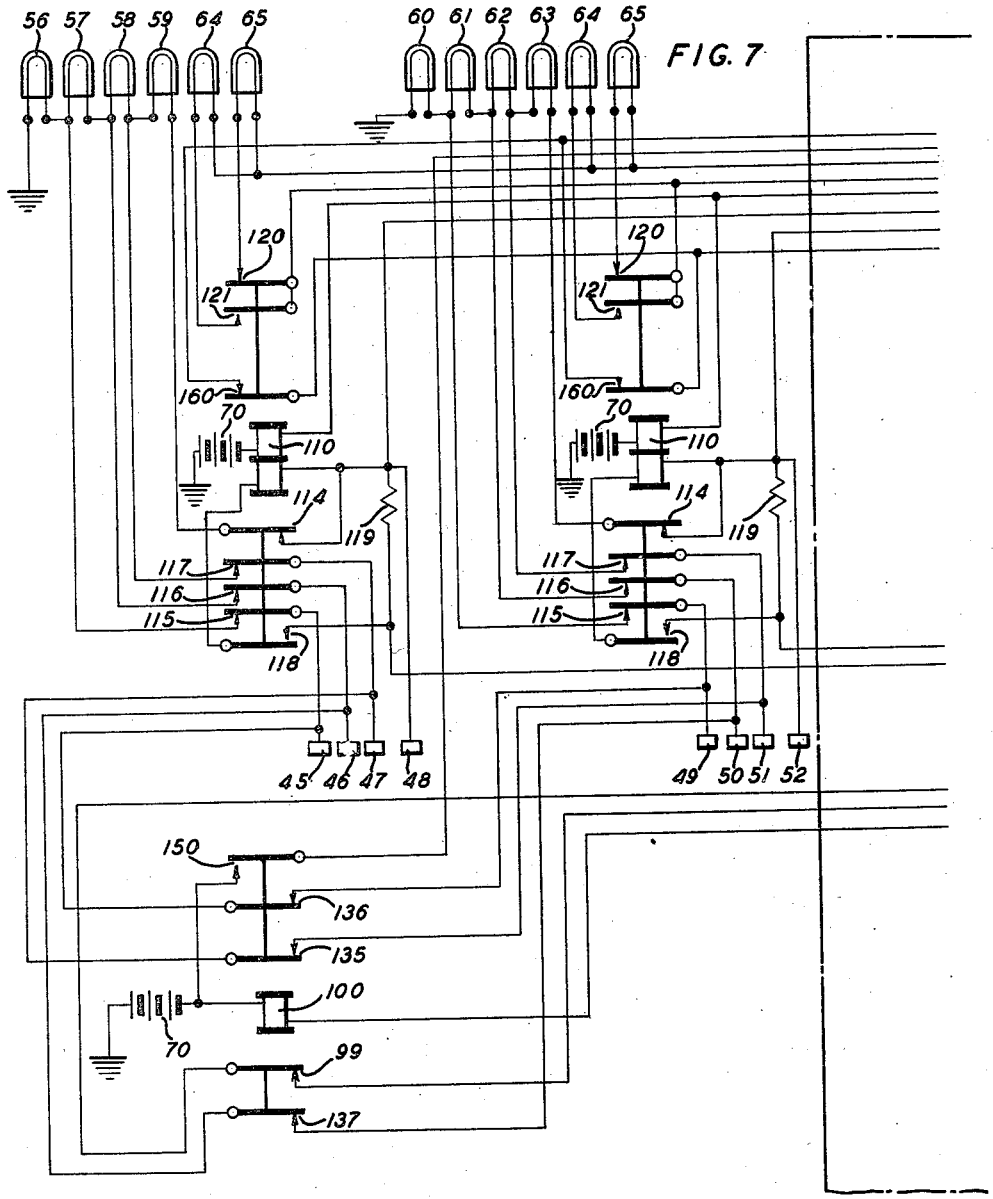

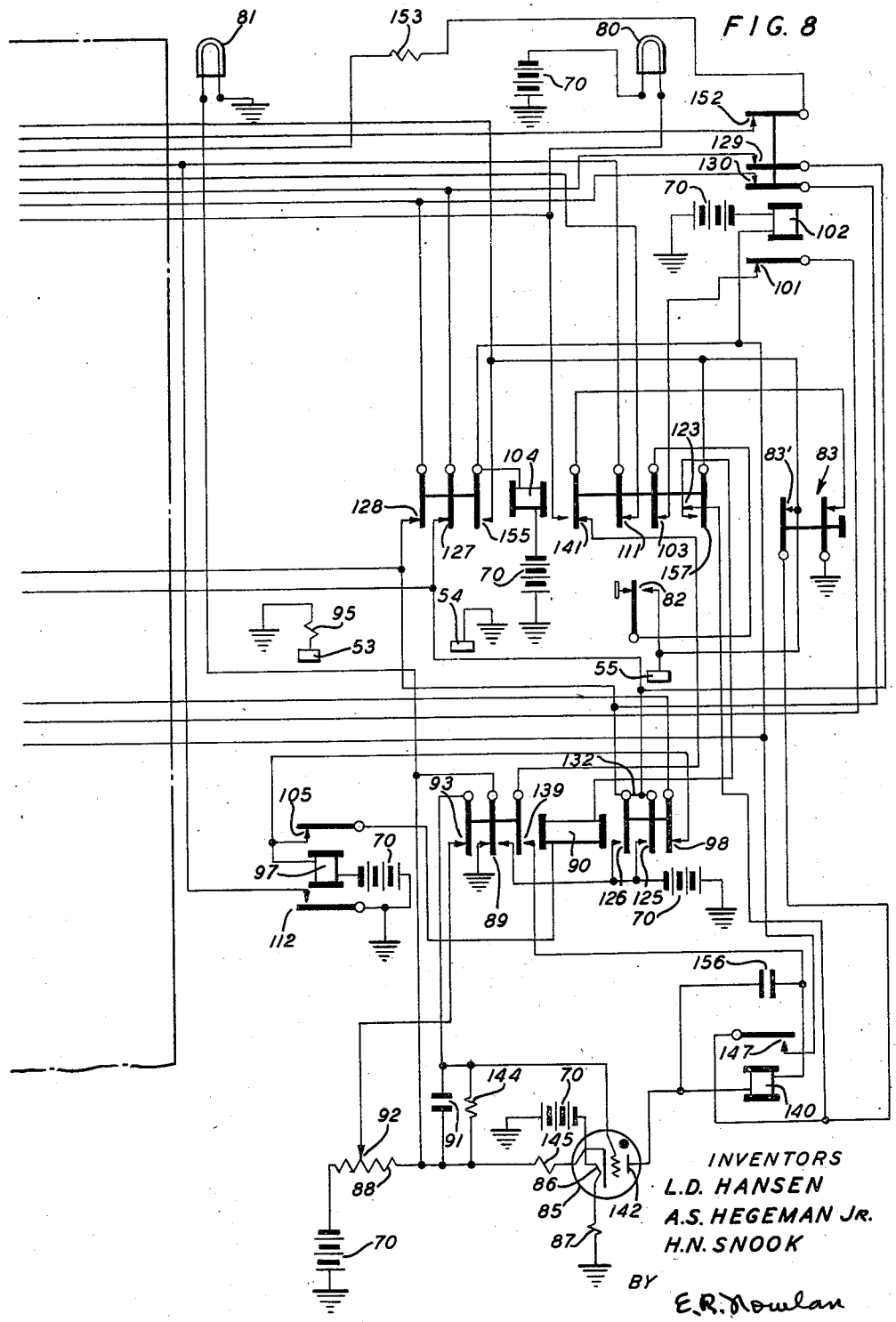

Patented July 22, 1947

2,424,275

UNITED STATES PATENT OFFICE 2,424,275

ELECTRICAL TESTING APPARATUS

Lloyd D. Hansen, Fanwood, Andrew S. Hegeman, Jr., Glen Ridge, and Harry N. Snook, Maywood, N. J., assignors to Western Electric Company, Incorporated, New York, N. Y., a corporation of New York Application February 8, 1944, Serial No. 521,584

19 Claims. (Cl. 315—364)

This invention relates to electrical testing apparatus for testing electrical units, particularly heaters of vacuum tubes.

An object of the invention is to provide a simple, efficient and highly practical apparatus for testing heaters of vacuum tubes.

With this and other objects in view, the invention comprises a carrier adapted to receive a plurality of vacuum tubes to be tested and electrically connect the heaters thereof in testing circuits, and electrically controlled means actuable to subject the heaters of the vacuum tubes to a voltage greater than their normal voltage for a given length of time, reduce the voltage to the heaters to their normal voltage, and indicate the condition of the heaters of the vacuum tubes.

Other objects and advantages will be apparent from the following detailed description when considered in conjunction with the accompanying drawings, wherein Fig. 1 is a side elevational view of the testing apparatus showing the carrier for the vacuum tubes connected to the testing unit;

Fig. 2 is a fragmentary sectional view taken along the line 2—2 of Fig. 1;

Fig. 3 is a fragmentary top plan view of the apparatus showing mainly the carrier structure and its connection with the testing unit;

Fig. 4 is a front elevational view of the panel of the testing unit, this view being taken substantially along the line 4—4 of Fig. 1;

Figs. 7 and 8, combined and disposed side by side in numerical order, illustrate the testing circuit in the testing unit.

Figure 6:
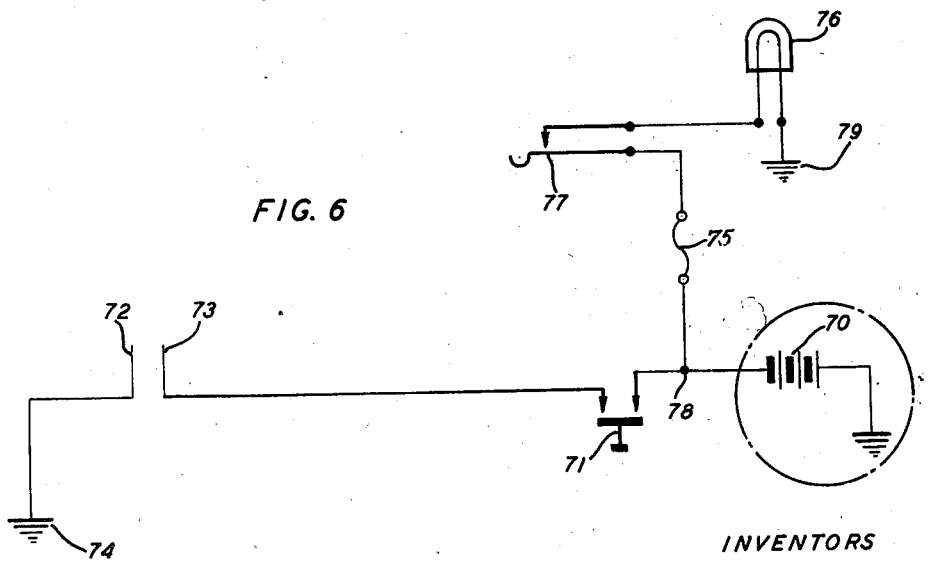
Fig. 6 illustrates the main power circuit.

Referring now to the drawings, attention is first directed to Figs. 1 to 4 inclusive, wherein there is illustrated a testing unit 10 housing the electrical circuits and units illustrated in Figs. 6, 7 and 8. The unit 10 is provided with a panel 11 in which are disposed control switches and indicating lamps which will hereinafter be described, these being shown in Fig. 4. Angle members 14 are fixed to the unit 10 at the bottom edges thereof and project forwardly therefrom, providing guideways to receive a carrier or tray 15. The purpose of providing a separate structure in the form of the carrier or tray 15 removably attached to the unit 10, is to increase production through the use of the testing apparatus in conjunction with a plurality of carriers or trays, some of which may be supplied with vacuum tubes while the vacuum tubes of another tray are being tested. The carrier 15 is in the form of a hollow rectangular casing having its top portion apertured to receive a plurality of sockets 16 of the types desired for vacuum tubes 17 and 18 to be tested. The apparatus was designed to test various types of vacuum tubes in a plurality of groups but to simplify the disclosure, only two groups have been chosen for illustration, the other groups being shown in dot and dash lines in Figs. 1 and 3. Attention at this time is directed to the indicating lamps in the central group in Fig. 4, wherein the first two rows are shown in solid lines representing the two groups of vacuum tubes 17 and 18; the other rows of circles formed of dot and dash lines representing the groups of vacuum tubes illustrated by the dot and dash circles in Fig. 3 and also in Fig. 1.

The carrier 15 is provided with a handle 20 through the aid of which it may be moved relative to the unit 10 to connect and disconnect the carrier electrically with the unit. This electrical connection is produced through the aid of an electrical socket 21 disposed in the rear wall of the carrier 15 and a plug 22 carried by the front wall of the unit 10. The interengaging parts of the plug and socket will be hereinafter described as illustrated in the circuits shown in Figs. 5, 7 and 8.

Figure 5:
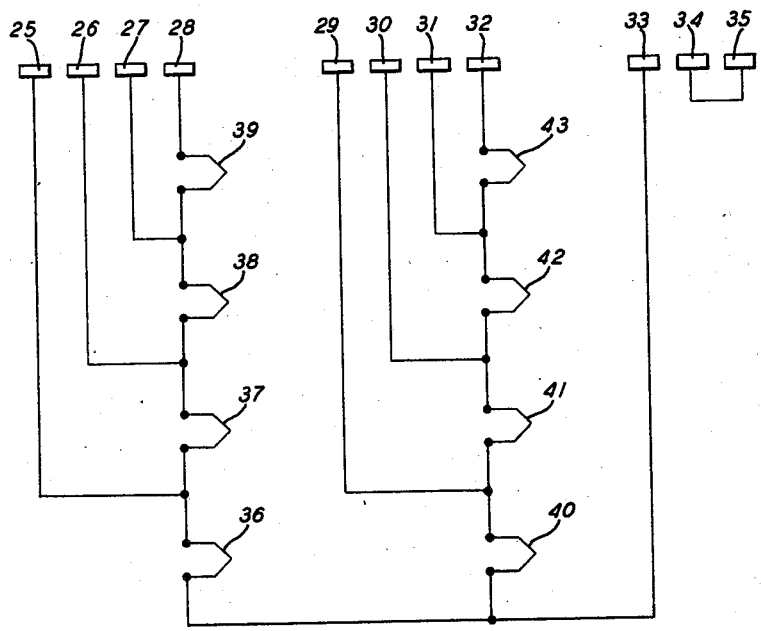
Fig. 5 illustrates the wiring diagram of the carrier shown in Figs. 1 and 3.

The electrical circuit shown in Fig. 5 is disposed in the carrier 15. Reference numerals 25, 26, 27 and 28 illustrate one group of socket portions of the socket 21, while reference numerals 29, 30, 31 and 32 represent another group of socket portions and reference numerals 33, 34 and 35 represent the third group of socket portions. These socket portions, which may hereinafter be called electrical connections or terminals, cooperate with similar connections in the circuits shown in Figs. 7 and 8 to introduce the heaters of their respective groups of vacuum tubes in series in the testing circuits. In the first group including the vacuum tubes 17, the heaters are indicated by reference numerals 36, 37, 38 and 39, while in the other group including the vacuum tubes 18, the heaters thereof are identified by reference numerals 40, 41, 42 and 43. Thus through the circuit shown in Fig. 5 illustrating the wiring connections between the sockets 16 for both groups of vacuum tubes 17 and 18 with their respective electrical connections 25 to 32 inclusive in the socket 21, there is provided means for individually connecting the heaters of the vacuum tubes in the testing circuit during the performance of the test and with certain of the indicating lamps to visually indicate the results of the test upon each vacuum tube. In Fig. 7 electrical connections 45 to 52 inclusive represent portions of the plug 22 of the unit 10 for mechanical as well as electrical engagement with their respective connections 25 to 32 inclusive. In Fig. 8 electrical connections 53, 54 and 55 are also parts of the plug 22 and adapted for mechanical as well as electrical engagement with the electrical connections 33, 34 and 35, respectively, of Fig. 5. These electrical connections are completed between the tray or carrier 15 and the unit 10 when disposed in the relative positions shown in Fig. 1.

The indicating lamps previously referred to as being shown in Fig. 4 for their respective heaters 36 to 43 inclusive are identified by reference numerals 56 to 63 inclusive. For each group of vacuum tubes, particularly the heaters thereof, there are indicating lamps which are termed OK lamps and reject lamps. One of each of these lamps is provided for each group of vacuum tubes and are identified by reference numerals 64 and 65.

Attention is now directed to Fig. 6, which illustrates the power circuit. To simplify the wiring diagram illustrated in Figs. 7 and 8, combined, the electrical power supply is shown in Fig. 6 with a grounded battery 70 as a symbol to indicate each point in the various circuits which is connected to the power supply. It should be understood, therefore, that wherever a grounded battery 70, as indicated in the dot and dash circle in Fig. 6, appears in Figs. 7 and 8, connection is made at these points with the power circuit shown complete in Fig. 6. This circuit includes what might be termed an ON switch 71, which closes the circuit to the various points represented by the grounded battery 70, from supply lines 72 and 73, one (72) of which is grounded at 74 while the other extends through a fuse 75. An indicating lamp 76 may also be connected to the supply circuit through a test switch 77 and connection 78, the lamp being grounded at 79.

Before describing the various circuits shown in the wiring diagram in Figs. 7 and 8 combined, a broad description of the function of the apparatus will be made so that the functions of the test circuits may be more readily understood. In the present embodiment the function of the apparatus is to apply approximately twice the normal voltage to the heaters of the groups of vacuum tubes for a given length of time, for example, seven seconds. After this has been accomplished the heater voltage is reduced to normal and other circuits are completed to indicate whether or not any of the vacuum tubes, that is, the heaters thereof, have failed. Failures are indicated by the indicating lamps in the unit 10 and in actual practise these lamps carry numbers corresponding to the number locations of the vacuum tubes in the carrier 15. Also, the reject lamp of any group wherein there exists a failure will be illuminated. However, if no failure has occurred, the OK lamp lights to indicate a satisfactory test.

In the present instance the apparatus may test various types of vacuum tubes constructed for various normal voltages. Some, for example, are 6.3 volt vacuum tubes, while others are 12.6 volt vacuum tubes. In the present illustration two groups of the former are illustrated in solid lines and given reference numerals 17 and 18, and when connected in their circuits their total normal voltage for each group is 25.2 volts. During the application of the double voltage, the equipotential points between each group are interconnected, to form a grid network, to equalize potentials across all tubes. These connections are removed when the heater voltage is reduced to normal for their connections with their various indicating lamps for the indication of any tube failures if such should exist.

When the tray or carrier 15, with the selected tubes for test have been disposed in the sockets of their respective groups and connected with the unit 10 through the various electrical connections formed in the socket 21 and the plug 22, the ON switch 71 is operated and approximately one minute is allowed for the timing control tube hereinafter described, illustrated in the lower portion of a testing circuit in Fig. 8, to heat. At this time the test switch 77 is pressed to determine, through the lighting of the lamp 76, whether or not the testing unit, that is, the testing circuits shown in Figs. 7 and 8, are energized and the protective fuse 75 is intact.

Attention is directed to Fig. 4, wherein there is illustrated a check lamp 80 which is lit through the closing of a circuit resulting from accurate connection between the carrier 15 and the unit 10. There is also a test lamp 81 which is lit when the testing circuits function. These lamps are marked CK for check and T for test. There is also a start switch 82 and a stop switch 83, which will hereinafter be described, to control the testing circuit.

After the "on" switch 71 has been closed and the time allowed for the timing control tube to heat, the start switch or button 82 is momentarily closed, at which time the check lamp 80 goes out and the test lamp 81 lights to indicate that the test cycle has started. The closure of the start switch 82 through the function of the circuits shown in Figs. 7 and 8 first applies a double voltage to the heaters of the vacuum tubes under test; second, connects the equipotential points between the groups of tubes; third, removes the indicating lamps 56 to 63 inclusive and 64 and 65 from the heater circuit; and fourth, starts the timing circuit for controlling the time interval in which the double voltage is applied to the heaters of the vacuum tubes under test.

After the given length of time, namely, seven seconds, the timing circuit hereinafter described operates, causing the check lamp 80 to light, indicating that the testing cycle is completed. If no tube failures have occurred, the OK lamp 64 lights for each group of tubes under test. If a tube has failed, the reject lamp 65 lights for the group of tubes in which the failure has occurred and the lamp in the group 56 to 59 inclusive or 60 to 63 inclusive, corresponding to the defective tube lights to indicate which one of the group has failed the test. If all OK lamps 64 are lit, the test circuit may be restored to normal by removing the tray or carrier 15 with the tubes from the testing unit 10. At this time all lamps go out.

If defective tubes are shown by the indicating lamps, they should be replaced with untested tubes. The lamp for the defective tube will go out when this tube has been replaced by an untested tube, but the reject lamp 65 remains lit. This set of tubes in which there existed a defective tube must, therefore, be re-tested to assure that each tube in the set has been given an adequate test. However, it is necessary to wait a given length of time, for example, five minutes, for cooling of the previously tested tubes between restoring the circuit in the unit 10 to normal and applying a second test. It is, therefore, necessary to remove the tray of tubes from the unit 10 and press the stop switch to restore the circuit to normal. The stop switch 83 may be pressed at any time during the timing cycle to stop the test and restore the testing circuit to normal, at which time the test lamp 81 goes out and the check lamp 80 lights.

Considering now the specific details of the testing circuit shown in Figs. 7 and 8 in conjunction with the circuits shown in Figs. 5 and 6, the step by step functions of the apparatus will be described.

Before placing a tray and tubes to be tested in connection with the unit 10, certain steps are taken to determine whether or not the unit is in readiness for testing. First, the ON switch 71 is actuated, placing a source of electrical energy at all the points represented by the grounded battery 70. The time control tube indicated at 25 is then energized from grounded battery through a filament 86 of the tube through a resistance 87 of a desired value, to ground. Also a circuit is completed from grounded battery through a potentiometer 88, through normally closed contact 89 of a relay 90, to ground. A condenser 91 is charged through a center arm 92 of the potentiometer 88 and normally closed contact 93 of the relay 90. The charge of the condenser 91 controls the time setting of the timing circuit. This may be adjusted by varying the setting of the center arm 92 of the potentiometer.

The test key or switch 77 is then closed to determine whether or not power is available in the test circuits and whether or not the fuse 75 is intact. The switch 77 is then released, causing the lamp 76 to go out. At this time the carrier or tray 15 with the vacuum tubes to be tested may be moved into place guided by the angle members 14 until the plug 22 and socket 21 interengage to connect the socket members or electrical connections 25 to 35 inclusive with the plug or connecting elements 45 to 55 inclusive. At this time the check lamp 80 lights from grounded battery 70 through normally closed contacts 160 of relays 110, and through electrical connections 55—35 and 34—54, to ground. It will be noted that the elements 53 and 54 are provided with ground connections, a resistance 95 of a given value being disposed between the element 53 and its ground. Through the connection of the elements 34 and 35, their connection with the elements 54 and 55 connect the latter to ground.

The start switch 82 is then pressed, causing a relay 97 to operate from the grounded battery 70, through the relay winding, through normally closed contact 98 of the relay 90, through normally closed contact 99 of a relay 100, through normally closed contact 101 of a relay 102, through normally closed contact 103 of a relay 104, through the start switch, electrical connections 55—35 and 34—54, to ground. By including normally closed contacts of the various relays to complete this circuit, the operator is assured that these relays have not operated falsely. By the closing of a contact 105 of the relay 97, a locking circuit is prepared for the winding of the relay 90 when this relay operates.

Attention at this time is directed to the groups of indicating lamps in the upper portion of Fig. 7. As previously described, the testing apparatus is adapted to test a plurality of groups of vacuum tubes. However, only two groups have been selected for illustration. Therefore, the two groups of circuits illustrated in Fig. 7 by the lamps 56 to 59 inclusive and 60 to 63 inclusive in addition to their OK and reject lamps 64 and 65, are illustrated with their electrical connections 45 to 48 inclusive and 49 to 52 inclusive under the control of their respective relays 110. These relays are given identical reference numerals in that they are identical parts of like groups of circuits. Similar groups of circuits would be included in the portion surrounded by the rectangular frame of dot and dash lines. However, only two groups of circuits have been illustrated and when the relays 110 are referred to hereinafter, it will be understood that both relays will act simultaneously.

The next function, after the pressing of the start switch 82, is the completion of a circuit from the grounded battery 70, through the secondary, or upper windings, of the relays 110, through normally closed contact 111 of relay 104 through operated contact 112 of relay 97, to ground, to cause operation of the relays 110. At this time the check lamp 80 goes out as ground is removed therefrom through the opening of contacts 160 of the relays 110. The opening of contacts 114, 115, 116 and 117 of the relays 110 removes the indicating lamps 56 to 63 inclusive from the circuits while the test is being performed upon the heaters of the vacuum tubes. The closing of contacts 118 of the relays 110 shunts the primary or lower windings of these relays across resistors 119 and prepares the relays to hold operated on their primary windings after the completion of the test. The opening of contacts 120 and the closing of contacts 121, respectively, remove ground from the reject lamps 65 and place ground on the OK lamps 64 to indicate, after the completion of the test, if all tubes pass favorably.

The start switch 82 is pressed momentarily, and during this interval all of the aforementioned functions occur in a given order. When the start switch 82 is released, direct ground is removed from the contact 105 of the relay 97. The relay 97, however, holds operated through the contact 105, through the relay 90, which at this time operates through contact 123 of relay 104, through contacts 83 of the stop switch 83, through connections 55—35 and 34—54, to ground. The current through the windings of the relays 97 and 90 in series is sufficient to operate the relay 90. Through the operation of the relay 90, the opening of contact 98, opens the ground path for the start switch 82, rendering this switch inoperative until the testing cycle has been completed. The closing of contacts 125 and 126 connects grounded battery 70 through contacts 127 and 128 of the relay 104 in parallel with contacts 129 and 130 of relay 102, through terminals or electrical connections 48—28 and 52—32, through the heaters 36 to 43 inclusive of vacuum tubes under test, through the connections 33—53 and resistance 95, to ground. This applies a double voltage to the heaters of the groups of vacuum tubes. The contacts 129 and 130 of the relay 102 are in parallel with the contacts 127 and 128 of the relay 104 and the contacts 125 and 126 of the relay 90 and are strapped together, as at 132, between the contacts 125 and 126 to provide multiple paths for the double voltage applied to the heaters of the vacuum tubes and minimize the possibility of applying improper test due to contact failures. The relay 100 in its normal position connects the equipotential points between the vacuum tube groups through contacts 135, 136, and 137.

Through the opening of contact 93 of the relay 90 and the transferring of the contact 89 from ground to the grounded battery 70 and the closure of contact 139, electrical energy from the grounded battery 70 is applied to the test lamp 81, to ground. The test lamp at this time lights. Ground is then applied to the circuit including a relay 140, through the normal contacts of the stop switch 83, through contact 141 of relay 104, through contact 139 of relay 90, through the winding of the relay 140 to plate 142 of the tube 85. The transferring of the contact 89 of the relay 90 from ground to the grounded battery 70 substitutes a battery or electrical energy for the ground on the cathode of the tube 85. Opening of the contact 93 of the relay 90 removes the charging potential from the condenser 91. This action starts the timing cycle. Ground on the plate, and negative battery on the cathode energize the tube 85. The charge of the condenser 91, which is connected to the grid of the tube 85, prevents the tube from firing until the condenser has discharged through a resistor 144 to the point where the grid loses control.

After a given length of time, namely seven seconds, the tube 85 fires and the relay 140 operates. The circuit may be traced from grounded battery 70 at relay 90, through the operated contact 89 thereof, through a resistor 145, through the cathode to the plate 142 of the tube, through the relay 140, through operated contact 139 of the relay 90, through contact 141 of relay 104 through contact 83 of the stop switch, to ground. Upon operation of the relay 140, its contact 147 is closed to cause operation of relays 100, 102 and 104, completing circuits from the grounded battery 70 of these relays through the normally closed contact 83' of the stop switch through terminal connections 55—35 and 34—54, to ground. At this time the check lamp 80 lights, the circuit being traced from its grounded battery 70 through the lamp 80, through the operated contact 141 of relay 104, through the stop switch 83, to ground.

Upon operation of the relay 100, the contacts 99, 135, 136 and 137 are opened, removing the equipotential strapping between the electrical connections 25—45, 26—46, 27—47, 28—48, 29—49, 30—50, 31—51 and 32—52. The opening of contact 99 of relay 100 also opens the ground path from the start switch 82. The operation of the relay 100 closes contact 150, partially completing a circuit from the grounded battery 70 of this relay to relay 102 to subsequently cause lighting of the OK and reject lamps 64 and 65.

Considering now the relay 102, its operation causes opening of contacts 129 and 130 to remove the shunt path across the contacts 127 and 128 of the relay 104. The opening of the contact 101 of the relay 102 opens the ground path from the start switch 82. The remaining contact 152 is operated, completing circuit from grounded battery 70 of the relay 100 through operated contact 150, through operated contact 152, through a resistor 153 to the OK and reject lamps 64 and 65. This chain of contacts assures the proper operation of the relays 100 and 102 before any testing indications are produced.

Referring now to the relay 104, its operation causes opening of contacts 127 and 128 which have, in their normally closed positions, been shorting out resistors 119. Their introduction in series with the heaters of the tubes under test, that is, one resistor for each group of tubes under test, reduces the voltage across the heaters to a normal voltage. Operation of the relay 104 closes contact 155 and completes circuits from the grounded battery 70 of the relays 104, 102 and 100 and through electrical connections or terminals 55—35 and 35—54, to ground, providing locking circuits for these relays after the relay 140 releases. Operation of the contact 141 of the relay 104 opens the ground circuit from the contacts of the stop switch 83' through the operated contact 139 of relay 90, through the winding of the relay 140 to the plate of the tube 85. This cuts off the tube 85 and allows the relay 140 to release. A condenser 156 shunts the winding of the relay 140 to provide a slow release characteristic and gives sufficient time to insure operating and locking of the relays 104, 102 and 100. The contact 147 of the relay 140 opens the operating path for the relays 104, 102 and 100. The opening of contact 103 of relay 104 opens the ground connection with the start switch 82. The operation of a contact 157 breaks contact at 123 and completes another circuit to transfer a ground connection for operating the relay 90 from contacts of the stop switch 83' to a ground through electrical connections or terminals 55—35 and 34—54. This requires removal of the carrier or tray 15 from the unit 10 to restore the testing circuits to normal. The opening of the contact 111 of the relay 104 removes ground from the contact 112 of the relay 97 to the secondary winding of the relays 110. This transfers the operation of the relays 110 from their secondary windings to their primary windings. If no defective heaters have occurred during the test of the vacuum tubes in a particular group, the current drawn through the primary winding of that particular relay 110 due to the combination of the primary winding being parallel by the dropping resistor 119 in series with the vacuum tube heaters of the group, will be sufficient to hold the relay 110 operated. If such be the case, the OK lamp 64 is lighted from grounded battery 70, through operated contact 150 of the relay 100, through operated contact 152 of relay 102, through resistor 153, the OK lamp, through operated contact 121 of the relay 110, through operated contact 112 of the relay 97, to ground. If there is a defective heater in any group of tubes, there will be no current through the primary winding of its respective relay 110, and this relay will release, causing the reject lamp 65 for that group to light. If a defective heater exists in one of the tubes under test, resulting in the opening of the circuit to the relay 110 for that particular group, the opening of contact 121 opens the circuit to the OK lamp 64 of this group to prevent it from lighting, and the closing of contact 120 completes a circuit to the reject lamp 65 associated therewith. This circuit may be traced from grounded battery 70 of the relay 100 through operated contact 150, through operated contact 152 of relay 102, through the resistor 153 through the reject lamp of the respective group in which the failure exists, through the contact 120 of the respective relay 110, through operated contact 112 of the relay 97, to ground. The closure or return to normal of the contacts 115, 116, 117 and 114 of the respective relay 110, connects the lamps 56, 57, 58 and 59, assuming that the defect occurs in the first group, in parallel with the heaters of the tubes in this group. The tubes which are not defective will shunt down their indicating lamps and prevent lighting thereof. The lamp for the defective tube is not shunted and sufficient voltage is developed to light its respective lamp. Therefore, through the lighting of the reject lamp of this group, the operator is notified that a defective tube is present therein and by the subsequent lighting of the indicating lamp associated with the defective tube, the operator is notified as to the exact tube of the group which is defective. The opening of the contact 118 of the given relay 110 prevents this relay from re-operating to produce an OK indication for its group of tubes under test by holding the circuit open to the relay.

When a defective tube exists in a group under test, this tube is removed from its socket 16 in the carrier or tray 15. This tube is replaced by another tube to be tested, resulting in the shunting down of the indicating lamp which previously lighted to indicate the defective tube. The closure of the contact 169 of the relay 110 under consideration at this time provides parallel ground paths on the relays 104, 102, 100, 97 and 90; to prevent the circuit returning to normal when the tray is removed. Also, ground is established through a stop switch 83, through the operated contact 141 of relay 104, through closed contact 169 of the relay 110 under consideration, through electrical connections 55—35 and 34—54, to ground.

Whenever a defective tube exists, it is important that the test be repeated after replacing the defective tube with an untested tube to be sure that each tube receives the necessary test and is not prevented therefrom by the defective tube. The tray 15 must be removed from the unit 10 after replacing a defective tube with an untested tube, and at this time the stop switch 83 is operated to return the testing unit to normal. If the untested tube is defective, the indicating lamp for that location will remain lighted, but if it is not defective, this lamp will then go out.

If there are no defective tubes in any of the groups, the tray or carrier 15 is removed from the unit 10, at which time all of the relays release and the OK, test and check lamps go out, as the ground connections at the electrical connections 55—35 and 34—54 are removed from the test circuits by removal of the tray from the testing unit, restoring the testing unit or the circuits therein to their normal conditions ready for the next test cycle. By pressing the stop switch 83, the reject lamps go out together with the individual indicating lamps for each tube.

In reviewing the testing apparatus, it will be observed that there is means disposed therein to electrically connect the vacuum tubes under test for the application of an abnormal voltage thereto. During this interval the vacuum tubes in each group under test have their elements or heaters connected in series to receive the abnormal or double voltage. After this, during the operation of certain of the relays in the testing circuit, the heaters of the tubes are connected singly in circuits with indicating lamps, there being an indicating or OK lamp for each group which will be lighted if the heaters in all of the tubes of that group pass the test or withstand the abnormal voltage. There is also a separate indicating lamp for each element or vacuum tube heater which functions if its particular heater breaks down. This, of course, occurs after the application of the abnormal voltage for the given length of time and after the electrical energy to the heaters has been reduced to the given normal voltage.

Although specific improvements of the invention have been shown and described, it will be understood that they are but illustrative and that various modifications may be made therein without departing from the scope and spirit of this invention as defined by the appended claims.

What is claimed is:

1. An apparatus for testing vacuum tubes comprising means to electrically connect in series, heater elements of vacuum tubes adapted for a given total normal voltage, means to apply electrical energy of a voltage greater than the given total normal voltage to the heater elements in series, and means to indicate any vacuum tube whose heater element failed to withstand the greater voltage.

2. An apparatus for testing vacuum tubes comprising means to electrically connect in series, heater elements of vacuum tubes adapted for a given total normal voltage, means to apply electrical energy of a voltage greater than the given total normal voltage to the heater elements in series, means to control the length of time the greater voltage is applied to the heater elements, and means to indicate any vacuum tube whose heater element failed to withstand the greater voltage.

3. An apparatus for testing vacuum tubes comprising means to electrically connect in series, heater elements of vacuum tubes adapted for a given total normal voltage, means to apply electrical energy of a voltage greater than the given total normal voltage to the heater elements in series, a timing unit, means rendered effective, after a given length of time under the control of the timing unit, to reduce the electrical energy to the given normal voltage, and means to indicate any vacuum tube whose heater element failed to withstand the greater voltage.

4. An apparatus for testing vacuum tubes comprising means to electrically connect in series, heater elements of vacuum tubes adapted for a given total normal voltage, means to apply electrical energy of a voltage greater than the given total normal voltage to the heater elements in series, an indicating lamp for each vacuum tube, and means to simultaneously electrically connect each heater element to shunt its respective lamp when effective and to cause the lamp for any heater element failing to withstand the greater voltage, to light.

5. An apparatus for testing vacuum tubes comprising means to electrically connect in series, heater elements of vacuum tubes adapted for a given total normal voltage, means to apply electrical energy of a voltage greater than the given total normal voltage to the heater elements in series, a timing unit, means rendered effective, after a given length of time under the control of the timing unit, to reduce the electrical energy to the given normal voltage, indicating lamps for the respective vacuum tubes, and means to simultaneously electrically connect each element with its respective lamp to cause the lamp for any element failing to withstand the greater voltage, to light.

6. An apparatus for testing vacuum tubes comprising a tray having sockets for receiving vacuum tubes, heater elements of which are to be tested, a testing unit, separable means to electrically connect the heater elements of the tubes to the unit, means in the unit to apply an abnormal electrical voltage to the said heater elements, and separate means carried by the unit for each element to subsequently indicate if the elements withstand the abnormal voltage.

7. An apparatus for testing vacuum tubes comprising a tray having sockets for receiving vacuum tubes, heater elements of which are to be tested, a testing unit, separable means to electrically connect the heater elements of the tubes to the unit, means in the unit to apply an abnormal electrical voltage to the said elements, and means carried by the unit and operable subsequent to the abnormal change to indicate if there are any of the said elements which have failed to withstand the abnormal voltage.

8. An apparatus for testing vacuum tubes comprising a tray having sockets for receiving vacuum tubes, heater elements of which are to be tested, a testing unit, separable means to electrically connect the heater elements of the tubes to the unit, means in the unit to apply an abnormal electrical voltage to the said elements, means carried by the unit to indicate if there are any of the said elements which have failed to withstand the abnormal voltage, and additional means carried by the unit to indicate which of the said elements failed to withstand the abnormal voltage.

9. An apparatus for testing vacuum tubes comprising a tray having sockets for receiving vacuum tubes, heater elements of which are to be tested, a testing unit, companion members respectively carried by the tray and unit to removably connect the heater elements of the tubes electrically with the unit, means to guide the tray relative to the unit to cause accurate interfitting of the companion members, means in the unit to apply an abnormal electrical voltage to the said elements, and means carried by the unit to indicate if all elements withstand the abnormal voltage.

10. An apparatus for testing vacuum tubes comprising a tray having sockets for receiving vacuum tubes, heater elements of which are to be tested, a testing unit, means to supply electrical energy of a given value to the unit, a signal to indicate whether or not the electrical energy is supplied to the unit, and means actuable to operate the signal if the electrical energy is applied to the unit, separable means to electrically connect the heater elements of the tubes to the unit, means in the unit to apply an abnormal electrical voltage to the said elements, and means carried by the unit to indicate if all elements withstand the abnormal voltage.

11. An apparatus for testing heaters of vacuum tubes comprising a testing unit, a power circuit for supplying, to the unit, an abnormal charge of electrical energy which is greater than the normal voltage for a heater of a vacuum tube to be tested, an element energizable to indicate if the heater fails as a result of the abnormal voltage, an element energizable to indicate if the heater withstands the abnormal voltage, a timing means in the testing unit to control the length of time the abnormal charge is applied to the heater and means successively actuable, to connect the heater to the power circuit to subject the heater to the abnormal voltage charge thereof, to cause the timing means to function to limit the time the charge is applied to the heater, and cause energization of one of the elements dependent upon the result of the abnormal voltage charge on the heater.

12. An apparatus for testing heaters of vacuum tubes comprising a testing unit, a power circuit for supplying, to the unit, an abnormal charge of electrical energy which is greater than the normal voltage for a heater of a vacuum tube to be tested, an element energizable to indicate if the heater fails as a result of the abnormal voltage, an element energizable to indicate if the heater withstands the abnormal voltage, a timing means in the testing unit to control the length of time the abnormal charge is applied to the heater, means to connect the heater to the power circuit to subject the heater to the abnormal voltage charge thereof, means rendered effective by the timing means to reduce the electrical energy through the heater to the normal voltage thereof, and separate means responsive to the results of the test and singly actuable to cause energization of one of the elements dependent upon whether or not the heater withstood the abormal charge.

13. An apparatus for testing heaters of vacuum tubes comprising a testing unit, a power circuit for supplying, to the unit, an abnormal charge of electrical energy which is greater than the combined normal voltage for heaters of a group of vacuum tubes to be tested, an energizable indicating element for each vacuum tube heater, means to connect the heaters of the vacuum tubes in series with the power circuit to subject the heaters to the abnormal charge thereof, and means to cause energization of any one of the elements whose heater fails to withstand the abnormal voltage.

14. An apparatus for testing heaters of vacuum tubes comprising a testing unit, a power circuit for supplying, to the unit, an abnormal charge of electrical energy which is greater than the combined normal voltage for heaters of a group of vacuum tubes to be tested, an energizable indicating element for each vacuum tube heater, means to connect the heaters of the vacuum tubes in series with the power circuit to subject the heaters to the abnormal charge thereof, and separate means to connect each heater in a circuit with its respective indicating element and to cause energization of each element whose heater failed to withstand the abnormal voltage.

15. An apparatus for testing heaters of vacuum tubes comprising a testing unit, a power circuit for supplying, to the unit, an abnormal charge of electrical energy which is greater than the combined normal voltage for heaters of a group of vacuum tubes to be tested, an energizable indicating element for each vacuum tube heater, means to connect the heaters of the vacuum tubes in series with the power circuit to subject the heaters to the abnormal charge thereof, means to limit the time the abnormal charge is applied to the heaters, and means operable subsequent to the abnormal charge to cause energization of any one of the elements whose heater fails to withstand the abnormal charge.

16. An apparatus for testing heaters of vacuum tubes comprising a testing unit, a power circuit for supplying, to the unit, an abnormal charge of electrical energy which is greater than the combined normal voltage for heaters of a group of vacuum tubes to be tested, an energizable indicating element for each vacuum tube heater, means to connect the heaters of the vacuum tubes in series with the power circuit to subject the heaters to the abnormal charge thereof, means to limit the time the abnormal charge is applied to the heaters to the power circuit, resistance means under the control of the time limiting means to reduce the electrical energy to the said normal voltage, and means operable subsequent to the abnormal charge to cause energization of any one of the elements whose heater fails to withstand the abnormal voltage.

17. An apparatus for testing vacuum tubes comprising a tray having sockets for receiving vacuum tubes, heater elements of which are to be tested, a testing unit, a power circuit for supplying a given electrical energy to the unit and including means carried by the tray to complete the circuit, separable means to electrically connect the heater elements of the tubes to the unit, means in the unit to apply an abnormal electrical voltage to the said elements, and means carried by the unit to indicate if all elements withstand the abnormal voltage.

18. An apparatus for testing vacuum tubes comprising a tray having sockets for receiving vacuum tubes, heater elements of which are to be tested, a testing unit, a power circuit for supplying a given electrical energy to the unit and including means carried by the tray to complete the circuit, means carried by the unit to indicate the completion of the power circuit through the means in the tray, separable means to electrically connect the heater elements of the tubes to the unit, means in the unit to apply an abnormal electrical voltage to the said elements, and means carried by the unit to indicate if all elements withstand the abnormal voltage.

19. An apparatus for testing vacuum tubes comprising a tray having sockets for receiving vacuum tubes, heater elements of which are to be tested, a testing unit, a power circuit for supplying a given electrical energy to the unit and including means carried by the tray to complete the circuit, separable means to electrically connect the heater elements of the tubes to the unit, means in the unit to apply an abnormal electrical voltage to the said elements, means carried by the unit to indicate if all elements withstand the abnormal voltage, and means for use in removing the tray from the unit to open the power circuit and render the unit ineffective.

LLOYD D. HANSEN.
ANDREW S. HEGEMAN, JR.
HARRY N. SNOOK.

REFERENCES CITED

The following references are of record in the file of this patent:

UNITED STATES PATENTS

| Number | Name | Date |
| --- | --- | --- |
| 2,211,421 | Herrick | Aug. 13, 1940 |
| 2,280,448 | Pfeiffer | Apr. 21, 1942 |
| 2,325,789 | Miller | Aug. 3, 1943 |
| 1,765,396 | Betts | June 24, 1930 |